United States Patent
Kinoshita

(10) Patent No.: US 11,296,635 B2
(45) Date of Patent: Apr. 5, 2022

(54) CONTROL SYSTEM FOR MOTOR

(71) Applicant: TOYOTA JIDOSHA KABUSHIKI KAISHA, Toyota (JP)

(72) Inventor: Gohki Kinoshita, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/005,455

(22) Filed: Aug. 28, 2020

(65) Prior Publication Data
US 2021/0091696 A1    Mar. 25, 2021

(30) Foreign Application Priority Data

Sep. 19, 2019 (JP) .............................. JP2019-170038

(51) Int. Cl.
*H02P 21/26* (2016.01)
*H02P 21/14* (2016.01)

(52) U.S. Cl.
CPC ............ *H02P 21/26* (2016.02); *H02P 21/141* (2013.01); *H02P 2207/05* (2013.01)

(58) Field of Classification Search
CPC ....... H02P 21/26; H02P 21/141; H02K 21/38; H02K 21/40; H02K 21/42
See application file for complete search history.

(56) References Cited

U.S. PATENT DOCUMENTS

2019/0123670 A1* 4/2019 Hashimoto ............. H02P 21/22
2020/0295610 A1* 9/2020 To ......................... H02K 1/2793

FOREIGN PATENT DOCUMENTS

JP        2012-157182 A    8/2012

* cited by examiner

*Primary Examiner* — Bickey Dhakal
(74) *Attorney, Agent, or Firm* — Oliff PLC

(57) ABSTRACT

A control system for motor configured to control currents supplied to an armature coil and a field coil properly to achieve a required torque. The control system controls torque of a rotor by controlling a base torque generated by energizing an armature coil, and a field torque generated by energizing a field coil. When a target torque is equal to or greater than a predetermined torque, the controller controls the base torque and the field torque such that a ratio of the field torque to the target torque is increased greater than that of a case in which the target torque is less than the predetermined torque.

6 Claims, 4 Drawing Sheets

CONTROL SYSTEM FOR MOTOR

CROSS-REFERENCE TO RELATED APPLICATIONS

The present invention claims the benefit of Japanese Patent Application No. 2019-170038 filed on Sep. 19, 2019 with the Japanese Patent Office, the inventions of which are incorporated herein by reference in its entirety.

BACKGROUND

Field of the Invention

Embodiments of the present disclosure relate to the art of a drive control system for a motor configured to increase magnetic flux established by a magnet arranged in a rotor and torque derived from a rotating magnetic field acting on the magnet, by establishing field flux in addition to the magnetic flux established by the magnet.

Discussion of the Related Art

JP-A-2012-157182 describes a variable-field rotary electric machine comprising a rotor provided with a permanent magnet, an annular stator arranged around the stator, armature coils arranged in the stator in the circumferential manner at regular intervals, and a magnetic field generator connected to an axial end of the stator. Each of the armature coils establishes a magnetic field in accordance with a current supplied thereto. The magnetic field generator comprises a field yoke and a field coil. Specifically, the field yoke comprises a diametrically-larger section joined to an axial end of the stator, a wall section closing an opening end of the diametrically-larger section, and a diametrically-smaller section protruding from an inner circumferential portion of the wall section toward the rotor. The field coil is formed by winding a wire around the diametrically-smaller section. In the variable-field rotary electric machine taught by JP-A-2012-157182, the field flux established by energizing the field coil serves as a magnetic circuit passing through the rotor, the stator, and the field yoke. However, since the field flux makes a turn at a portion between the diametrically-larger section and the wall section, an eddy current loss is caused at the portion between the diametrically-larger section. In order to reduce such eddy current loss, according to the teachings of JP-A-2012-157182, the diametrically-larger section is joined to the wall section through a fixing member formed of material whose eddy current loss is smaller than the field yoke.

In the variable-field rotary electric machine taught by JP-A-2012-157182, a rotating magnetic field is produced in accordance with a current applied to the armature coil, and the variable-field rotary electric machine generates a base torque in accordance with strength of the rotating magnetic field. The base torque is increased by establishing a field flux acting in a same direction as the magnetic flux. That is, the base torque can be assisted by energizing the field coil. Thus, the variable-field rotary electric machine taught by JP-A-2012-157182 can generate torque not only by energizing only the armature coil, but also by energizing the field coil in addition to the armature coil. Specifically, the armature coil is energized with AC current, and hence electricity is supplied to the armature coil from a power source through a controller such as an inverter. On the other hand, the field coil is energized with DC current, and hence electricity is supplied to the field coil directly from the power source. Thus, the electricity is supplied to the armature coil and the field coil though different electric circuits. In order to achieve a required torque to be generated by the motor, therefore, it is necessary to control the torques generated by the armature coil and the field coil taking account of characteristics of the inverter.

SUMMARY

Aspects of embodiments of the present disclosure have been conceived noting the foregoing technical problems, and it is therefore an object of the present disclosure to provide a control system for a motor configured to control currents supplied to an armature coil and a field coil properly to achieve a required torque.

The control system according to the exemplary embodiment of the present disclosure is applied to a motor comprising: an annular rotor formed of magnetic body; a magnetic flux generator that creates a magnetic flux at a predetermined site along a circumferential direction of the rotor; a stator arranged around the rotor; an armature coil that is formed on the stator, and that is energized to create a rotating magnetic field with respect to the rotor; and a magnetic field generator having a field coil that is energized to generate a magnetic flux to enhance the magnetic flux created by the magnetic flux generator. In the motor, a torque of the rotor is controlled by controlling a base torque generated by energizing the armature coil, and a field torque generated by energizing the field coil. In order to achieve the above-explained objective, according to the exemplary embodiment of the present disclosure, the control system is provided with a controller that controls the base torque and the field torque. Specifically, the controller is configured to: calculate a target torque of the rotor; and control the base torque and the field torque such that a ratio of the field torque to the target torque is increased greater than that of a case in which the target torque is less than a predetermined torque, when the target torque is equal to or greater than the predetermined torque.

In a non-limiting embodiment, the predetermined torque may be set to a smaller value with an increase in a speed of the rotor.

In a non-limiting embodiment, a map determining the ratio of the field torque to the target torque in accordance with an operating point of the motor governed by the torque and a speed of the rotor may be installed in the controller. In addition, the controller may be further configured to: calculate the ratio of the field torque to the target torque based on the target torque and the speed of the rotor with reference to the map; and control the base torque and the field torque based on the ratio of the field torque to the target torque.

In a non-limiting embodiment, the controller may be further configured to determine the ratio of the field torque to the target torque in such a manner as to reduce a total value of: a loss resulting from energizing the armature coil to achieve the target torque; and a loss resulting from energizing the field coil to achieve the target torque.

In a non-limiting embodiment, the total value of the losses may include a copper loss as a resistive loss resulting from energizing the armature coil and the field coil.

In a non-limiting embodiment, the magnetic field generator may comprise: a field yoke as a magnetic body including an annular wall section opposed to an axial end surface of the rotor, and a cylindrical section projecting toward the rotor from a radially innermost portion of the wall section; and a field coil formed by winding a conducting wire around the cylindrical section.

Thus, according to the exemplary embodiment of the present disclosure, the torque of the motor is controlled by controlling the current applied to the armature coil to generate the base torque, and the current applied to the field coil to generate the field torque. When the target torque is greater than the predetermined torque, the controller controls the base torque and the field torque in such a manner that the ratio of the field torque to the target torque is increased greater than that of the case in which the target torque is less than a predetermined torque. That is, when a large torque is required, the field torque is increased. According to the exemplary embodiment of the present disclosure, therefore, the copper loss resulting from generating the base torque and the copper loss resulting from generating the field torque can be reduced, compared to the case of achieving the target torque only by the base torque. For this reason, energy loss resulting from generating the target torque can be reduced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
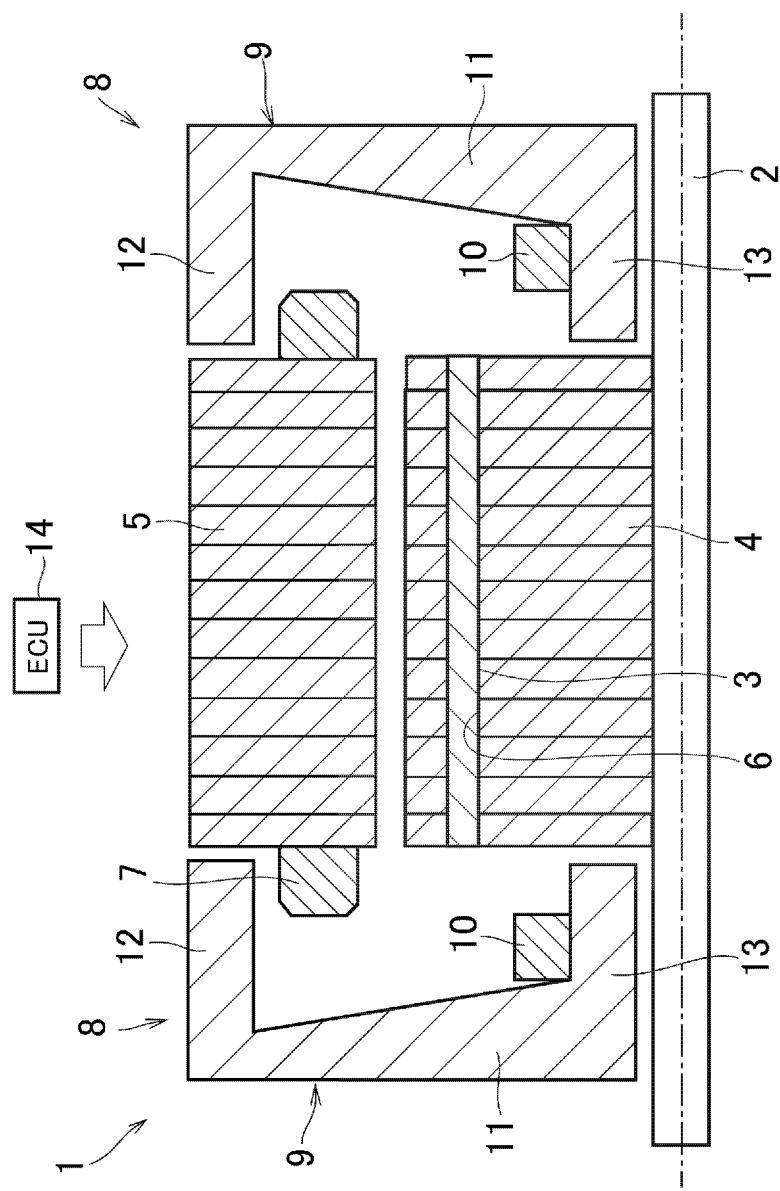
FIG. 1 is a partial cross-sectional view showing a cross-section of a motor to which the control system according to the exemplary embodiment of the present disclosure is applied.

An exemplary embodiment of the present invention will now be explained with reference to the accompanying drawings. Referring now to FIG. 1, there is shown a structure of upper half of a motor 1 to which the control system according to the exemplary embodiment of the present invention is applied. The motor 1 serves as a prime mover of an automobile such as a hybrid vehicle and an electric vehicle, and according to the exemplary embodiment of the present disclosure, an interior permanent magnet synchronous motor is adopted as the motor 1. The motor 1 comprises a rotor 4 integrated with a rotary shaft 2, a permanent magnet (as will be simply called the "magnet" hereinafter) 3 as a magnetic flux generator, and a stator 5 joined to a predetermined stationary member (not shown).

The rotor 4 is a magnetic body formed of a plurality of annular steel plates juxtaposed in an axial direction. A plurality of through holes 6 are formed on an outer circumferential section of the rotor 4 in a circumferential manner at predetermined intervals. Specifically, each of the through holes 6 penetrates through the rotor 4 in the axial direction, and the magnet 3 is inserted into each of the through holes 6 in such a manner that polarities of radially outer portions of the magnets 3 adjacent to each other are opposite to each other. That is, north pole and south pole of the magnets 3 are arranged alternately on the outer circumferential section of the rotor 4.

The stator 5 is also a magnetic body formed of a plurality of annular steel plates juxtaposed in an axial direction, and an inner diameter of the stator 5 is larger than an outer diameter of the rotor 4. On an inner circumferential surface of the stator 5, stator teeth protruding toward the rotor 4 respectively are formed at predetermined intervals while maintaining a predetermined clearance to an outer circumferential surface of the rotor 4, and a conducting wire is wound around each of the stator tooth to form an armature coil 7.

In order to enhance a magnetic flux created by the magnet 3, the motor 1 is provided with a magnetic field generator 8 that generates a magnetic flux. As illustrated in FIG. 1, a pair of the magnetic field generators 8 are disposed on both sides of the rotor 4 in the axial direction. A structure of each of the magnetic field generators 8 is identical to each other, therefore, a structure of one of the magnetic field generators 8 will be explained hereinafter.

The magnetic field generator 8 comprises a field yoke 9 as a magnetic body whose outer diameter is substantially identical to an outer diameter of the stator 5, and a field coil 10 that creates a field flux. Specifically, the field yoke 9 comprises an annular wall section 11 which is opposed to an axial end surface of the rotor 4 and in which a through hole is formed around a center axis, an outer cylindrical section 12 projecting toward the stator 5 from a radially outermost portion of the wall section 11, and an inner cylindrical section 13 projecting toward the rotor 4 from a radially innermost portion of the wall section 11. A conducting wire is wound around the inner cylindrical section 13 to form a field coil 10. The rotary shaft 2 is inserted into the through hole of the wall section 11 in a rotatable manner.

When the current is supplied to the field coil 10 in a predetermined direction, a field flux is established to act from an inner edge section of the inner cylindrical section 13 toward the rotor 4. By contrast, when the current is supplied to the field coil 10 in an opposite direction, a field flux is established to act toward the stator 5 through the wall section 11 and the outer cylindrical section 12.

Thus, the motor 1 is allowed to generate torque by energizing the armature coil 7, or by energizing the field coil 10 in addition to energizing the armature coil 7. As a conventional three-phase permanent magnet type synchronous motor, the motor 1 comprises three electric circuits such as a U-phase, a V-phase, and a W-phase. Those electrical circuits are individually connected to an inverter (not shown) so that DC current discharged from an electric storage device (not shown) such as an inverter and a capacitor is supplied to the electric circuit while being converted to AC current. That is, a phase of the current supplied to each phase of the motor 1 is shifted in accordance with a rotational angle of the rotor 4 by controlling the inverter.

By thus shifting the phase of the current applied to each phase of the motor 1 (i.e., the armature coil 7) a rotating magnetic field is created in the stator 5, and a strength of the rotating magnetic field varies depending on a current value applied to the armature coil 7. As a result, the magnets 3 buried in the rotor 4 are attracted or repelled to/from the rotating magnetic field so that the rotor 4 is rotated to generate a torque.

Figure 2:
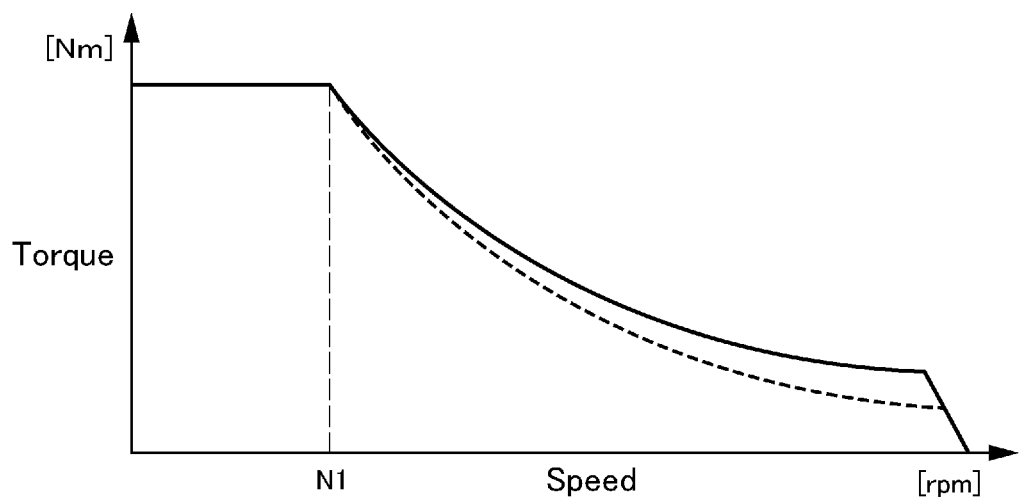
FIG. 2 is a map determining a relation between a speed and a torque generated by energizing only the armature coil.

When a rotational speed of the motor 1 is increased equal to or higher than a base speed N1, a counter electromotive force (i.e., an inductive voltage) resulting from rotation of the motor 1 is increased higher than an input voltage to the motor 1, and the motor 1 can no longer generates a torque. Therefore, when the rotational speed of the motor 1 is equal to or higher than the base speed N1, the current is applied to the armature coil 7 formed in a direction along a direct axis through which the flux of the magnet 3 flows, so as to reduce the magnetic flux established by the armature coil 7. That is, a so-called field weakening control is executed. Specifically, since the inductive voltage is increased with an increase in the speed of the rotor 4, the current value applied to the armature coil 7 formed in the direction along the direct axis is increased with the increase in the speed of the rotor 4. Consequently, the flux of the magnet 3 is reduced with the increase in the speed of the rotor 4. The torque possible to be generated by energizing only the armature coil 7 is indicated in FIG. 2. As indicated by the dashed curve in FIG. 2, the torque possible to be generated by energizing only the armature coil 7 decreases gradually with the increase in the speed of the rotor 4. Here, in FIG. 2, the solid curve is a constant output curve.

Figure 3:
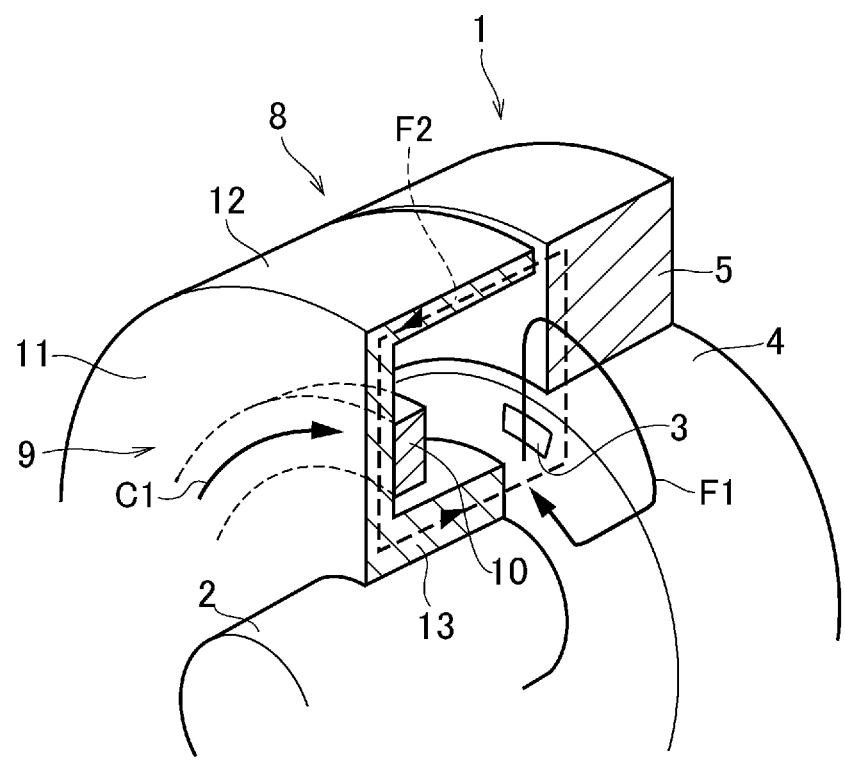
FIG. 3 is partially enlarged cross-sectional view showing a flow of a field flux.

The torque of the motor 1 may be increased by creating a magnetic flux in addition to the flux of the magnet 3 in the same direction as the flux of the magnet 3. That is, the torque of the motor 1 may be increased by enhancing the magnet flux. In the motor 1, the magnetic flux is enhanced by energizing the field coil 10. A magnetic flux F1 created in the motor 1 is illustrated in FIG. 3. Specifically, as illustrated in FIG. 3, the magnetic flux F1 flows from the rotor 4 to the stator 5 and passing through the stator 5 in the circumferential direction, and then flows from the stator 5 to the rotor 4 again. In order to enhance the magnetic flux F1, a magnetic flux F2 is created by applying the current to the field coil 10 in the direction C1. As indicated in FIG. 3, the magnetic flux F2 flows from the leading end of the inner cylindrical section 13 toward the rotor 4. Specifically, the magnetic flux F2 flows from the south pole of the magnet 3 situated in the inner circumferential portion of the rotor 4 toward the north pole of the magnet 3 situated in the outer circumferential portion of the rotor 4. The magnetic flux F2 further flows from the rotor 4 to the stator 5, and flows into the outer cylindrical section 12 through an end face of the stator 5. Thus, the magnetic flux F1 is enhanced by the magnetic flux F2 at a site where the magnetic flux F1 flows into the stator 5 from the rotor 4. As a result, the torque of the motor 1 is increased.

Strength of the magnetic flux F2 varies depending on a current value applied to the field coil 10. Here, it is to be noted that the magnetic flux F2 is established for the purpose of increasing the torque of the motor 1, and for this purpose, it is not necessary to reverse the direction of the magnetic flux F2 frequently. Therefore, DC current is supplied from the electric storage device to the field coil 10 without passing through the inverter. That is, the electric circuit to energize the armature coil 7 is independent from the electric circuit to energize the field coil 10.

The currents energizing the armature coil 7 and the field coil 10 are controlled by an electronic control unit (to be abbreviated as the "ECU" hereinafter) 14 comprising a microcomputer as its main constituent. The ECU 14 calculates values of the currents applied to the armature coil 7 and the field coil 10 based on data transmitted thereto from various sensors arranged in the vehicle using formulas and maps installed in advance, and transmits command signals to e.g., the inverter to supply the calculated currents to the armature coil 7 and the field coil 10.

To this end, for example, a position of an accelerator pedal detected by an accelerator sensor, a vehicle speed detected by a vehicle speed sensor, a rotational angle and a rotational speed of the motor 1 detected by a resolver (neither of which are shown) and so on are sent to the ECU 14. The maps installed in the ECU 14 includes a map determining a required drive force based on a position of the accelerator pedal and a vehicle speed, and a map determining a torque ratio Tf/Ttgt as a ratio of a field torque Tf to a target torque Ttgt in accordance with an operating point of the motor 1. For example, the command signals are transmitted from the ECU 14 to a switch element (not shown) of the converter or inverter, and an element for controlling the current value applied to the field coil 10.

Figure 4:
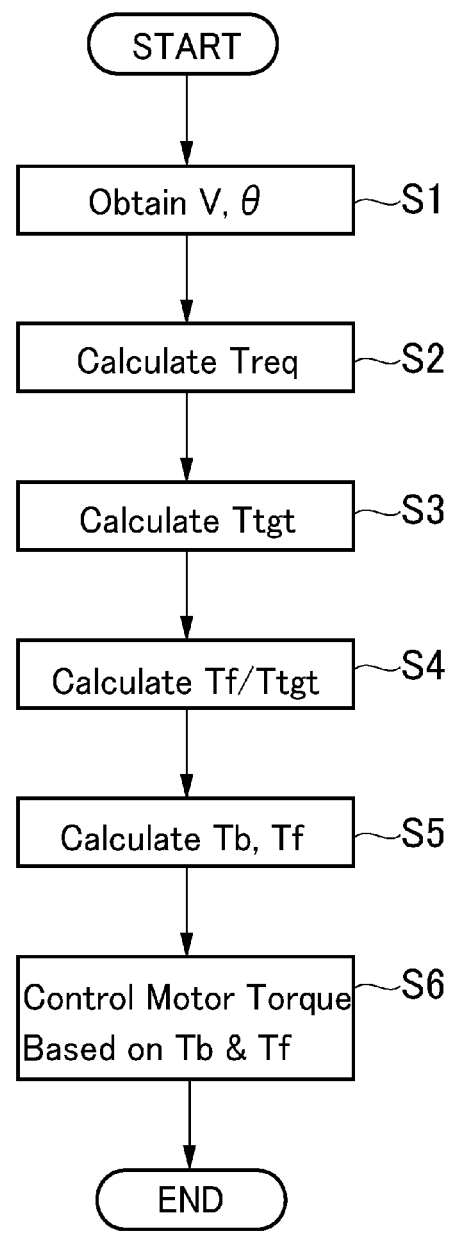
FIG. 4 is a flowchart showing a one example of a routine executed by the control system according to the exemplary embodiment of the present disclosure.

Thus, according to the exemplary embodiment of the present disclosure, the torque can be generated by energizing only the armature coil 7, or by energizing the field coil 10 in addition to energizing the armature coil 7. In order to control the motor 1, the control system according to the exemplary embodiment of the present disclosure is configured to calculate a current value applied to the field coil 10 based on a required torque to be generated by the motor 1 (or the rotor 4), that is, based on an operating point of the motor 1 governed by a speed and a torque of the motor 1. To this end, the control system executes procedures shown in FIG. 4. In the following explanations, a torque generated by energizing the armature coil 7 will be called the "base torque Tb", and a torque generated by energizing the field coil 10 will be called the "field torque Tf".

At step S1, a vehicle speed V is obtained by the vehicle speed sensor, and an operating amount θ of the accelerator pedal is obtained by the accelerator sensor. Then, at step S2, a required torque Treq to propel the vehicle is calculated based on the data obtained at step S1. Specifically, the required torque Treq may be calculated with reference to the aforementioned map determining a required drive force (i.e., the required torque) based on an operating amount θ of the accelerator pedal and a vehicle speed V.

At step S3, a target torque Ttgt of the motor 1 is calculated based on the required torque Treq calculated at step S2. For example, the target torque Ttgt may be calculated based on a gear ratio of a gear train between drive wheels and the motor 1 and the required torque Treq calculated at step S2.

At step S4, a torque ratio Tf/Ttgt as a ratio of the field torque Tf to the target torque Ttgt is calculated with reference to the aforementioned map determining the torque ratio Tf/Ttgt in accordance with an operating point of the motor 1. As described, the operating point of the motor 1 is governed by the target torque Ttgt and a current speed of the motor 1, and the map determining the torque ratio Tf/Ttgt is prepared in such a manner that an energy consumption of the motor 1 can be reduced by generating the field torque Tf by the field coil 10 in accordance with the torque ratio Tf/Ttgt at the current operating point. Specifically, the map determining the torque ratio Tf/Ttgt is prepared taking account of a resistive loss caused by Joule heating (i.e., a copper loss) resulting from generating the base torque Tb and the field torque Tf. More specifically, the map determining the torque ratio Tf/Ttgt is prepared in such a manner as to reduce a total value of: a loss resulting from energizing the armature coil 7 to achieve the target torque Ttgt; and a loss resulting from energizing the field coil 10 to achieve the target torque Ttgt.

Figure 5:
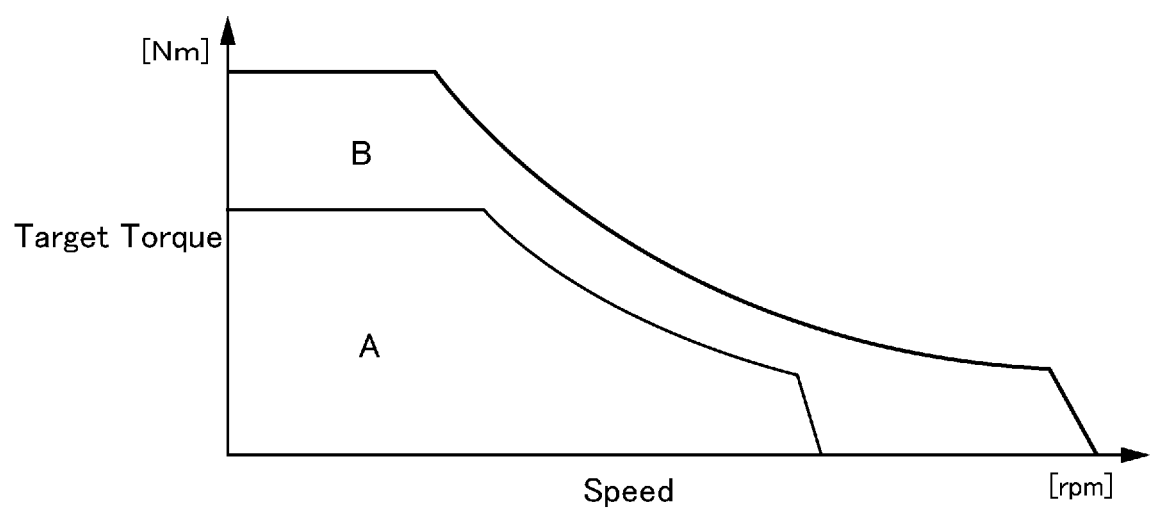
FIG. 5 is a map determining a ratio of a field torque to a target torque.

The base torque Tb is increased in accordance with the current value applied to the armature coil 7, therefore, if the base torque Tb is increased, Joule heat is increased with an increase in an electrical resistance in the electric circuit supplying electricity to the armature coil 7 and the field coil 10. Specifically, Joule heat is proportional to the square of the current applied to e.g., the oil. Therefore, it is preferable to increase the field torque Tf, that is, to increase the torque ratio Tf/Ttgt with an increase in the base torque Tb. Turning to FIG. 5, there is shown the map determining the torque ratio Tf/Ttgt according to the exemplary embodiment of the present disclosure. In FIG. 5, the vertical axis represents the target torque Ttgt, and the horizontal axis represents the speed of the motor 1. As can be seen from FIG. 5, the torque ratio Tf/Ttgt is smaller in the low power range (i.e., the low torque range) A than that in the high power range (i.e., the high torque range) B. That is, a ratio of the field torque Tf to achieve the target torque Ttgt is increased with an increase in the target torque Ttgt, or after the target torque Ttgt is increased equal to or greater than a predetermined torque. The predetermined torque is set to a smaller value with an increase in the speed of the motor 1 (or the rotor 4).

Turning back to FIG. 4, at step S5, the base torque Tb and the field torque Tf are calculated based on the torque ratio Tf/Ttgt determined at step S4, and at step S6, the torque of the motor 1 is controlled based on the base torque Tb and the field torque Tf calculated at step S5. At step S6, for example, the torque of the motor 1 may be controlled as a conventional manner to control torque in electric vehicles or hybrid vehicles. Thereafter, the routine returns.

Thus, according to the exemplary embodiment of the present disclosure, the torque ratio Tf/Ttgt as the ratio of the field torque Tf to achieve the target torque Ttgt is increased in the high torque range. According to the exemplary embodiment of the present disclosure, therefore, the torque of the motor 1 can be increased with respect to the electricity supplied from the electric storage device, compared to a case of achieving the target torque Ttgt only by the base torque Tb. In other words, it is possible to improve energy efficiency to operate the motor 1. In addition, during execution of the field weakening control, a reduction in the torque resulting from executing the field weakening control can be avoided by thus generating the field torque Tf. For this reason, the motor 1 can be operated along the constant output curve.

Although the above exemplary embodiment of the present disclosure has been described, it will be understood by those skilled in the art that the present disclosure should not be limited to the described exemplary embodiments, and various changes and modifications can be made within the scope of the present disclosure. For example, the torque ratio Tf/Ttgt may also be calculated when the target torque is determined, instead of obtaining with reference to the map. In addition, each of the rotor 4 and the stator 5 may be formed of magnetic material by an integral molding, instead of overlapping the steel plates. The magnet 3 may be attached to the outer circumferential surface of the rotor 4, instead of burying in the rotor 4. Moreover, an electric magnet formed by winding a conducting wire around an iron core may also be adopted as the magnet 3. Further, in order to magnetize the field yoke 9, the field coil 10 may also be formed by winding a conducting wire around an installation portion formed between a pair of slits formed on the wall section 11.

What is claimed is:

1. A control system for a motor comprising:
an annular rotor formed of magnetic body;
a magnetic flux generator that creates a magnetic flux at a predetermined site along a circumferential direction of the rotor;
a stator arranged around the rotor;
an armature coil that is formed on the stator, and that is energized to create a rotating magnetic field with respect to the rotor; and
a magnetic field generator having a field coil that is energized to generate a magnetic flux to enhance the magnetic flux created by the magnetic flux generator,
wherein a torque of the rotor is controlled by controlling a base torque generated by energizing the armature coil, and a field torque generated by energizing the field coil,
the control system comprising:
a controller that controls the base torque and the field torque,
wherein the controller is configured to:
calculate a target torque of the rotor; and
control the base torque and the field torque such that a ratio of the field torque to the target torque is increased greater than that of a case in which the target torque is less than a predetermined torque, when the target torque is equal to or greater than the predetermined torque.

2. The control system for the motor as claimed in claim 1, wherein the predetermined torque is set to a smaller value with an increase in a speed of the rotor.

3. The control system for the motor as claimed in claim 1, wherein a map determining the ratio of the field torque to the target torque in accordance with an operating point of the motor governed by the torque and a speed of the rotor is installed in the controller,
the controller is further configured to:
calculate the ratio of the field torque to the target torque based on the target torque and the speed of the rotor with reference to the map; and
control the base torque and the field torque based on the ratio of the field torque to the target torque.

4. The control system for the motor as claimed in claim 1, wherein the controller is further configured to:
determine the ratio of the field torque to the target torque in such a manner as to reduce a total value of: a loss resulting from energizing the armature coil to achieve the target torque; and a loss resulting from energizing the field coil to achieve the target torque.

5. The control system for the motor as claimed in claim 4, wherein the total value of losses resulting from energizing the armature coil and the field coil includes a copper loss as a resistive loss.

6. The control system for the motor as claimed in claim 1, wherein the magnetic field generator comprises:
a field yoke as a magnetic body including an annular wall section opposed to an axial end surface of the rotor, and a cylindrical section projecting toward the rotor from a radially innermost portion of the wall section; and
the field coil formed by winding a conducting wire around the cylindrical section.

* * * * *